United States Patent
Suzuki et al.

(10) Patent No.: US 7,151,622 B2
(45) Date of Patent: Dec. 19, 2006

(54) IMAGE READING AND RECORDING APPARATUS

(75) Inventors: Yoshiaki Suzuki, Chiba (JP); Akio Okubo, Tokyo (JP); Takashi Awai, Chiba (JP); Takayuki Nishinohara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1058 days.

(21) Appl. No.: 10/242,706

(22) Filed: Sep. 13, 2002

(65) Prior Publication Data
US 2003/0067619 A1 Apr. 10, 2003

(30) Foreign Application Priority Data
Sep. 18, 2001 (JP) .............................. 2001-283835

(51) Int. Cl.
H04N 1/04 (2006.01)
(52) U.S. Cl. ...................... 358/498; 358/471; 358/496; 358/474; 358/296
(58) Field of Classification Search ................ 358/496, 358/498, 296, 468, 401, 501, 474, 400, 472, 358/471; 399/367; 318/685, 696; 382/312, 382/318, 319; 347/32, 104
See application file for complete search history.

(56) References Cited

U.S. PATENT DOCUMENTS

| | | | | |
|---|---|---|---|---|
| 4,598,323 A | | 7/1986 | Honjo et al. ................. 358/496 |
| 4,866,531 A | * | 9/1989 | Kobori et al. ............... 358/400 |
| 5,153,738 A | | 10/1992 | Stemmle ...................... 358/296 |
| 5,206,737 A | * | 4/1993 | Sugiyama .................... 358/296 |
| 5,226,639 A | * | 7/1993 | Kida et al. ................... 271/109 |
| 5,552,902 A | * | 9/1996 | Kohno ......................... 358/498 |
| 5,663,804 A | | 9/1997 | Kataoka et al. ............. 358/304 |
| 5,793,399 A | * | 8/1998 | Kawakami et al. ......... 347/104 |
| 5,805,310 A | * | 9/1998 | Jean et al. ................... 358/498 |
| 5,854,696 A | * | 12/1998 | Yun ............................. 358/498 |
| 5,867,283 A | | 2/1999 | Nam ........................... 358/498 |
| 5,954,326 A | * | 9/1999 | Gaarder et al. ............ 271/9.02 |
| 6,015,202 A | | 1/2000 | Hiramatsu et al. ............ 347/32 |
| 6,019,363 A | * | 2/2000 | Ahn ........................ 271/10.05 |
| 6,178,863 B1 | * | 1/2001 | Kobayashi et al. ........... 83/649 |
| 6,342,956 B1 | * | 1/2002 | Hasegawa et al. .......... 358/472 |
| 6,366,343 B1 | * | 4/2002 | Lee .............................. 355/84 |
| 6,367,994 B1 | * | 4/2002 | Oshima et al. ............. 400/185 |
| 6,722,648 B1 | * | 4/2004 | Tsusaka et al. ............... 271/65 |
| 6,765,698 B1 | * | 7/2004 | Ha .............................. 358/474 |
| 6,942,215 B1 | * | 9/2005 | Kang et al. ............ 271/265.01 |
| 6,948,871 B1 | * | 9/2005 | Onishi et al. ............... 400/679 |

(Continued)

FOREIGN PATENT DOCUMENTS

EP 0 526 209 A2 2/1993

(Continued)

Primary Examiner—Cheukfan Lee
(74) Attorney, Agent, or Firm—Fitzpatrick, Cella, Harper & Scinto

(57) ABSTRACT

An image reading and recording apparatus is provided with a carriage having the drive switching gear, which transmits driving power to a reading drive gear train only in a drive switching position. Then, when a reading command is issued, the carriage moves to this drive switching position. For this operation, a driving motor that serves as one driving source is arranged to transmit the driving power thereof to the recording drive gear train and the reading drive gear train. Also, there is no need for an original and a recording sheet to pass different passages of transportation by shearing a common passage of transportation for use by both of them, hence making it possible to materialize downsizing the apparatus, and reducing the cost of manufacture as well.

22 Claims, 8 Drawing Sheets

U.S. PATENT DOCUMENTS 7,077,517 B1 * 7/2006 Awai et al. .................. 347/104

FOREIGN PATENT DOCUMENTS

| JP | 59 032249 A | 2/1984 |
|----|-------------|--------|
| JP | 5012212 | 1/1993 |
| JP | 5236217 | 9/1993 |
| JP | 2001-197235 A | 7/2001 |

* cited by examiner

IMAGE READING AND RECORDING APPARATUS

BACKGROUND OF THE INVENTION

1. Field of the Invention

The present invention relates to an image reading and recording apparatus provided integrally with image reading means for reading an image on an original and recording means for forming an image on a recording sheet. More particularly, the invention relates to an image reading and recording apparatus such as a facsimile machine.

2. Related Background Art

Conventionally, there has been proposed an image reading and recording apparatus, such as a facsimile machine, which is arranged to transport an original and a recording sheet on one route, for the purpose of downsizing the apparatus, and reducing the costs thereof as well.

For example, there is the one that uses a cartridge for recording use and a cartridge for reading use suitably as disclosed in the specification of Japanese Patent Application Laid-Open No. 05-012212. However, the cartridge exchange is an operation for a user to take a time. Also, unless an unused cartridge is carefully kept for storage, such problem is encountered as clogging of a cartridge for recording use or damages being given to a cartridge for reading use.

Also, there has been proposed in the specification of Japanese Patent Application Laid-Open No. 05-236217 a mode in which a reading portion and a recording portion are contained in a carriage. In this mode, although an operation is no longer necessary to use each of them suitably as described earlier, the dimension of the apparatus in the widthwise direction should become larger, thus being contradictory to the intention of downsizing.

SUMMARY OF THE INVENTION

Under such circumstances, it is required to materialize making the apparatus smaller at lower costs without spoiling the operability for the user.

The present invention is designed with a view on solving the technical problems encountered in the conventional art. It is an object of the invention to provide an image reading and recording apparatus for which downsizing and cost reduction can be implemented.

In order to achieve this object, the image reading and recording apparatus of the present invention comprises original feeding means for feeding an original; recording sheet feeding means for feeding a recording sheet; a driving source for generating driving power for the original feeding means and the recording sheet feeding means; original drive transmitting means for transmitting driving power from the driving source to the original feeding means; recording sheet drive transmitting means for transmitting driving power from the driving source to the recording sheet feeding means; moving means capable of moving in the direction perpendicular to the transporting direction of a recording sheet; recording means arranged on the moving means for performing recording operation with respect to a recording sheet, wherein the moving means switches driving power from the driving source in a drive switching position for the transmission thereof to the original drive transmitting means.

Preferably, the drive switching position may be a position for the moving means to be able to move outside the recording area where no recording is performed by the recording means.

Preferably, recording sheet separating means may be provided.

Also, preferably, original separating means may be provided.

Also, preferably, recording sheet separating means and original separating means may be provided.

Preferably, the moving means may be provided with gears, and driving power is transmitted to the original drive transmitting means from the driving source with the engagement of gears in the drive switching position.

Preferably, an original and a recording sheet may be arranged to pass one transport route.

Preferably, an original and a recording sheet are arranged to pass one transport route, and image reading means is provided in the one transport route.

Preferably, the recording means may be of ink jet recording type for recording on a recording sheet by discharging ink in accordance with a signal.

Preferably, the moving means may be provided with a protection mechanism to cover ink discharge mechanism provided for the recording means in the drive switching position.

Preferably, the moving means may be provided with an ink retaining mechanism capable of discharging ink from the recording means in the drive switching position.

With the structure thus arranged, therefore, it becomes possible to use one driving source for transporting an original and a recording sheet, hence realizing to make the apparatus smaller at lower costs. Also, there is no need for an original and a recording sheet to pass different transport routes as the original and the recording sheet can use one common transport route. Thus, this makes it possible to downsize the apparatus still more with a further reduction of costs.

BRIEF DESCRIPTION OF THE DRAWINGS

FIG. 8 is a perspective view that shows the relations between a lock-lever, a pendulum gear, a pendulum arm, a head recovery gear, and a recording drive gear in the

DESCRIPTION OF THE PREFERRED EMBODIMENTS

Hereinafter, with reference to the accompanying drawings, the detailed description will be made of the preferred embodiments of the present invention illustratively. However, it is to be understood that the dimensions, materials, configurations, relative arrangements thereof, and others, which are referred to in the description of the embodiment hereof, are not intended to limit the scope of the present invention thereto unless otherwise described specifically.

Now, with reference to FIG. 1 to FIG. 8, the embodiment will be described exemplifying the facsimile machine that performs ink jet recording as an image reading and recording apparatus.

Figure 1:
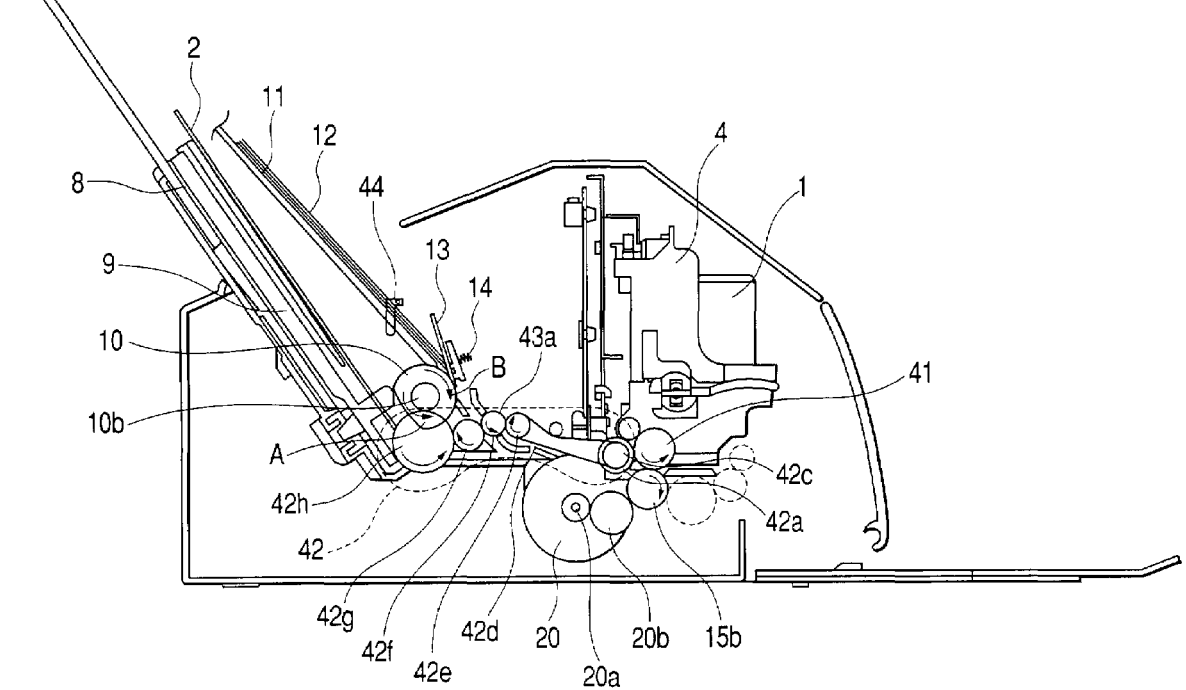
FIG. 1 is a cross-sectional view that schematically shows original drive transmission means of an image reading and recording apparatus according to an embodiment of the present invention.

At first, the description will be made of the structural outline characteristic of the present invention. In FIG. 1, a reference numeral 1 designates an ink cartridge serving as recording means, and a reference numeral 4 designates a carriage that serves as moving means for carrying and moving the ink cartridge 1.

Reference numerals 8 and 11 designate a feed tray and an original tray, which serve as retaining means for retaining recording sheets and originals, respectively.

The recording sheet 2 is fed and transported by a feed roller 10 and a pressure plate 9, which serve as recording sheet feeding means, and an original 12 is fed and transported by the feed roller 10, an original transporting roller gear 42f, a coaxially arranged original transporting roller 43a, and an opposed runner 43b, which serve as original feeding means.

Figure 3:
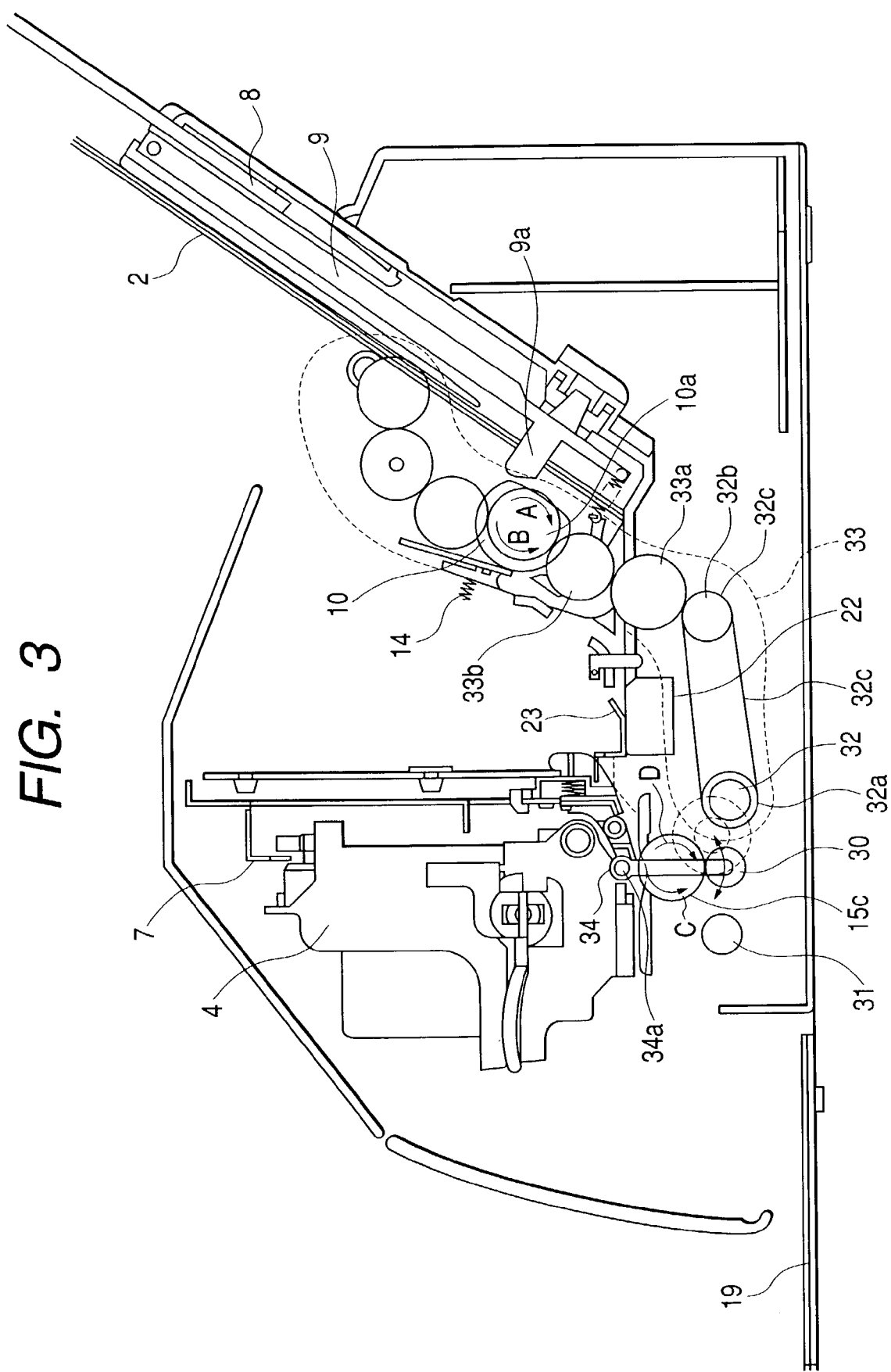
FIG. 3 is a cross-sectional view that schematically shows reading drive transmission means of the image reading and recording apparatus according to the embodiment of the present invention.

When a recording sheet 2 is fed by the feed roller 10, the recording drive gear train 33 (recording sheet drive transmitting means or a first gear train) is used for transmitting driving power to the feed roller 10 as shown in FIG. 3. When an original 12 is fed, driving power is transmitted to the feed roller 10 by use of the reading drive gear train 42 (original drive transmitting means or a second gear train) as shown in FIG. 1. A driving motor 20 that is one driving source transmits driving power to the recording drive gear train 33 and the reading drive gear train 42.

Figure 4:
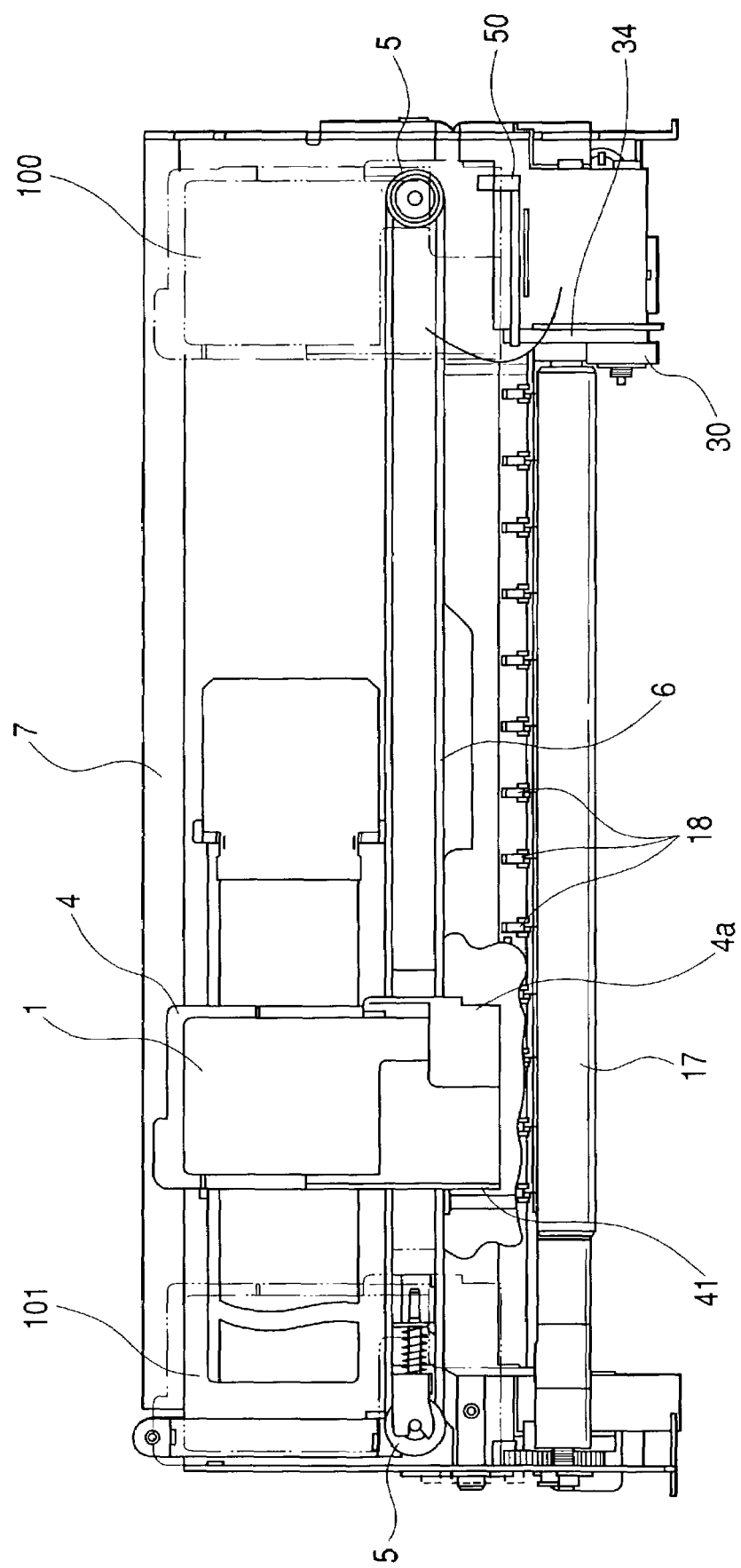
FIG. 4 is a plan view that shows a recording portion of the image reading and recording apparatus according to the embodiment of the present invention.
Figure 5:
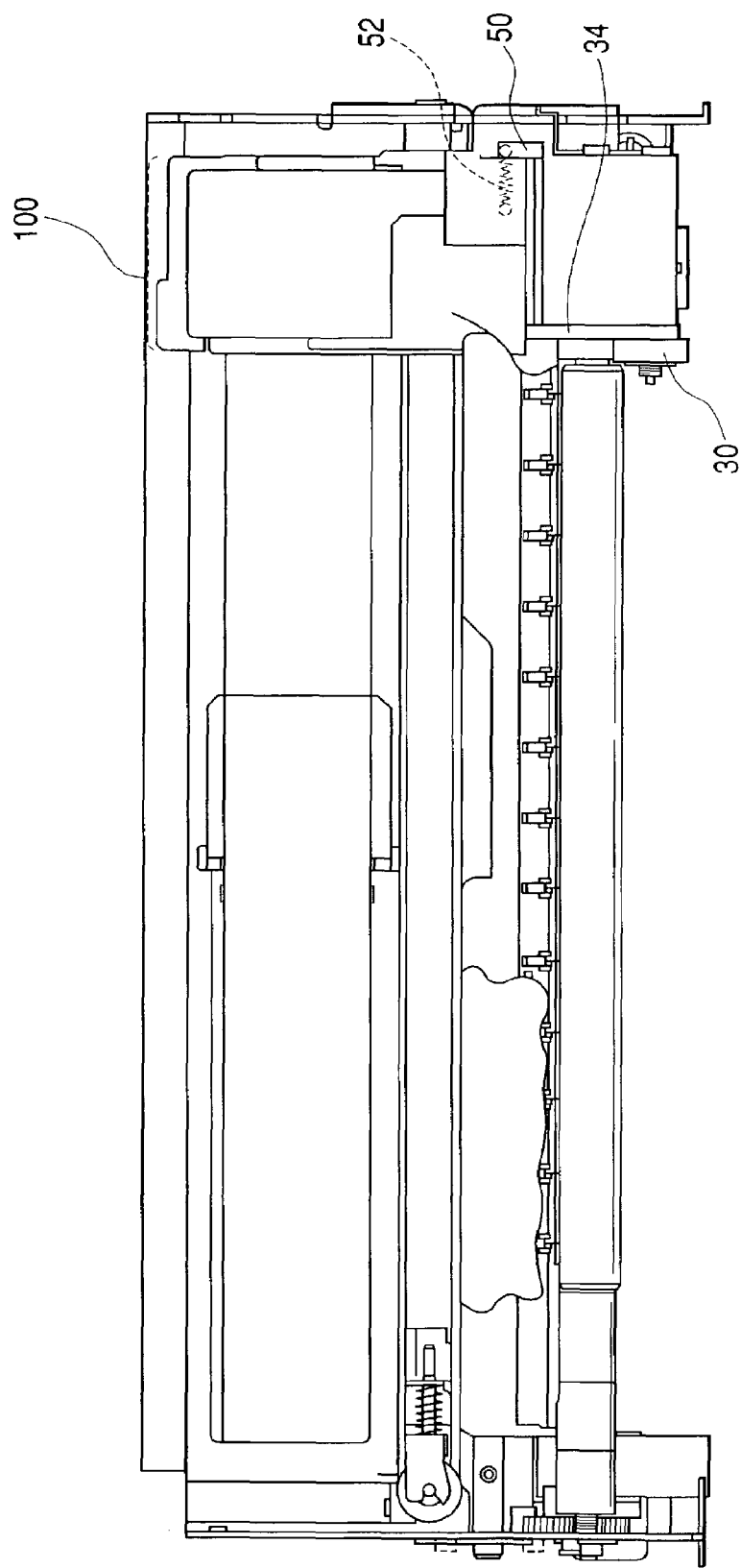
FIG. 5 is a plan view that shows the recording portion of the image reading and recording apparatus according to the embodiment of the present invention.

The carriage 4 is provided with a drive switching gear 41 (a second drive transmitting gear) that transmits driving power to the reading drive gear train 42 only in the drive switching position 101 (a second position) shown in FIG. 4, and when a reading command is issued, the carriage moves to the aforesaid drive switching position 101.

Next, the description will be made of the structure of the facsimile machine briefly.

(Recording Means)

Recording means is for recording ink images on a recording sheet transported by transporting means. Recording means of this apparatus uses the ink jet recording method that records by discharging ink from a recording head. In other words, The recording head is provided with fine liquid discharge ports (orifices), liquid paths, an energy activating portion provided in a part of each liquid path, and energy generating means for generating energy for the formation of liquid droplets that act upon liquid residing in the energy activating portion.

As the recording methods that use energy generating means for generating energy of the kind, there are those using electromechanical converting element, such as piezoelectric element, energy generating means for discharging liquid droplets by the action exerted by heating resulting from the irradiation of electromagnetic waves, such as laser, or energy generating means for discharging liquid by heating liquid using electrical/thermal converting element, such as heat generating element provided with a heating resistive element, among some others.

Of those means using such methods, the recording head that uses ink jet recording method for discharging liquid by the application of thermal energy makes it possible to arrange liquid discharge ports (orifices) in high density for discharging recording liquid droplets for the formation of liquid droplets for discharging use. Among such recording heads, the one that uses the electrical/thermal converting element as energy generating means makes it easier to be made compact, and also, easier to be assembled in high density by the full utilization of the advantages of the IC technologies and micro-machining techniques, the advancement and reliability of which have shown remarkable progress in the field of semiconductors in recent years. This one also has an advantage, among many others, that it makes the costs of manufacture lower.

Figure 2:
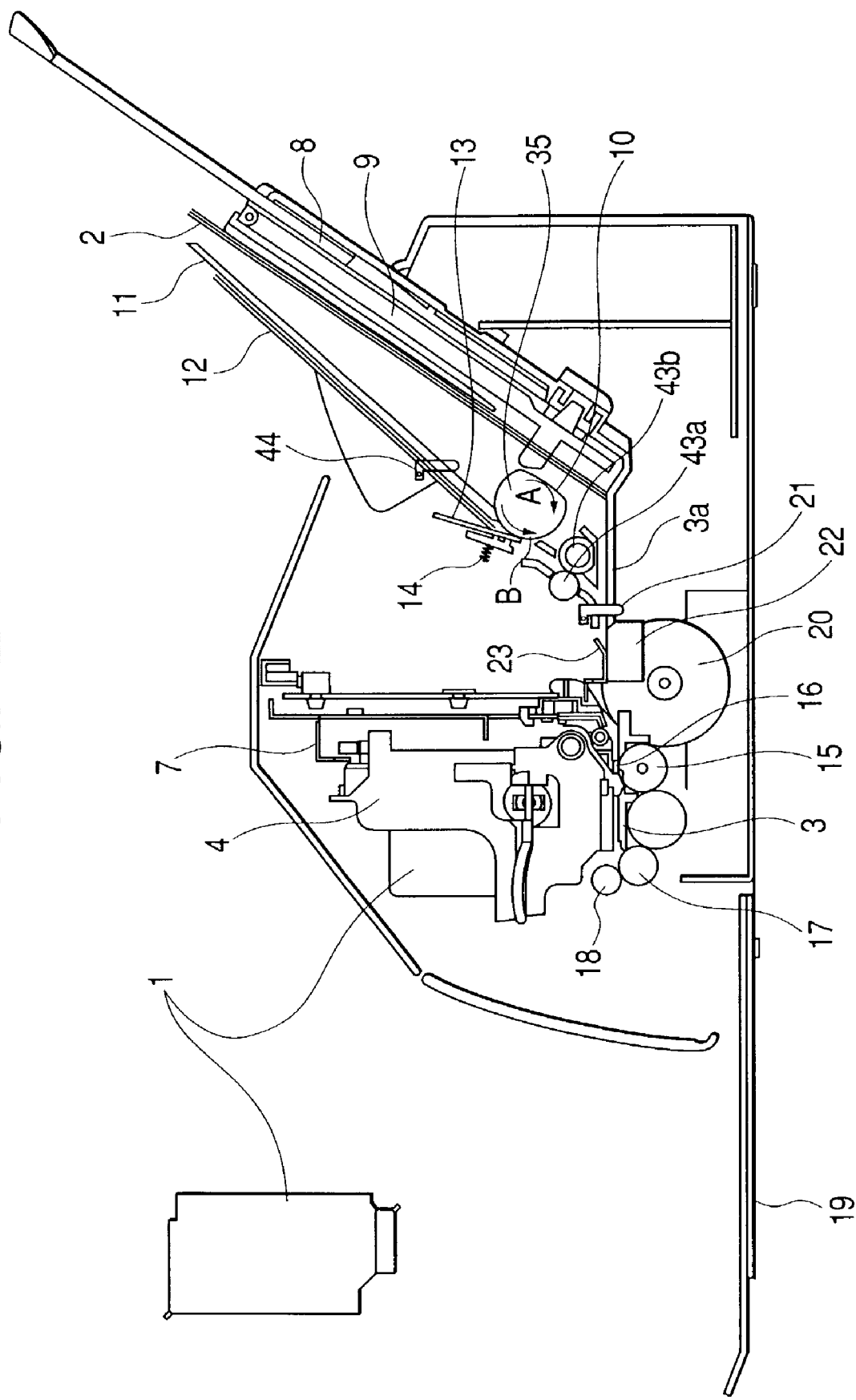
FIG. 2 is a sectional view that schematically shows the structure of an image reading and recording apparatus according to the embodiment of the present invention.

In the present embodiment, the disposable type ink cartridge 1, which is formed by integrating a recording head and an ink tank, is used as shown in FIG. 2. In a position opposite to the ink cartridge 1, a platen 3 is arranged for supporting a recording sheet 2.

(Carriage)

In FIG. 4, a reference numeral 4 designates a carriage that mounts the ink cartridge 1 and scans in the widthwise direction of a recording sheet 2. To the carriage 4, there is connected a timing belt 6 of endless type, which is stretched around pulleys 5 driven by a driving source (not shown), and by the rotational driving of the pulleys 5, the carriage 4 reciprocates along the guide rail 7.

The carriage 4 is usually on standby in the waiting position 100 (the first position) at the right end side of the guide rail 7. At that time, a rubber member (not shown) covers and protects the nozzle tips of the cartridge 1 so as not to allow the recording head to dry.

The pendulum arm 34 that supports the pendulum gear 30 (the first drive transmitting gear) performs pendulum motion centering on the axis of the transport roller 15. When the carriage is out of the waiting position 100, the lock-lever 50 is pulled by a coil spring 52 coupled with a hook 50c so as to move in the direction indicated by the arrow F in FIG. 7. Thus, swinging is regulated by locking the pendulum arm 34 with a locking pin 50b that fits into the engagement hole 34a of the pendulum arm 34. When the carriage 4 moves to the waiting position 100, an engagement portion 4a formed in the carriage 4 abuts against an engagement extrusion 50a formed in the lock-lever 50. Then, the lock-lever 50 is caused to move in the direction indicated by the arrow E against the biasing force provided by the coil spring 52. Thus, the locking pin 50b is withdrawn from the engagement hole 34a to release the locking. During this period, it is made possible for the pendulum gear 30 to perform pendulum motion centering on the axis of the transport roller 15.

As shown in FIG. 1, when the driving motor 20 rotates in the clockwise direction in a state where the carriage 4 has moved to the waiting position 100, the driving motor 20 transmits driving power to a first roller gear 15b provided on the end portion of the transport roller 15 through the output gear 20a of the driving motor 20 and an idler gear 20b.

As a result, as shown in FIG. 3, the transport roller 15 rotates in the sheet transporting direction. Simultaneously, a second roller gear 15c, which is provided on the recovery system side of the transport roller 15, rotates in the direction indicated by the arrow C. Then, with this, the pendulum gear 30 moves toward the recording drive gear 32 to engage with the recording drive gear 32, thus transmitting the driving power to the recording drive gear train 33.

The recording drive gear train 33 includes the recording drive gear 32, a driving pulley 32a fixed to the recording drive gear 32 coaxially with the recording drive gear 32; a pulley 32b to which driving power is transmitted through the driving pulley 32a and a belt 32c; a gear 32c coaxially fixed to the pulley 32b; a gear 33a that engages with the driving gear 32c, and a gear 33b. Driving power is transmitted to the reading sheet feed gear 10a fixed coaxially to the feed roller 10 through the gear train 33 to rotate the feed roller 10 clockwise direction (in the direction indicated by the arrow A).

The gear train 33 may be structured by only gears without belts and pulleys.

On the contrary, if the transport roller 15 rotates in the direction opposite to the sheet transporting direction, the second roller gear 15c rotates in the direction indicated by the arrow D, and the pendulum gear 30 shifts to the head recovery gear 31 side, thus transmitting the driving power to the recovery system gear train (not shown) for the operation of ink suction or the like from the recording head.

When the carriage 4 is out of the waiting position 100, the lock-lever 50 shifts to the left direction by spring force as shown in FIG. 4, and fits into the pendulum arm hole. Thus, driving power is no longer transmitted to the recording drive gear train 33 and the recovery gear train.

(Recording Sheet Feeding Means)

In FIG. 3, a reference numeral 8 designates a recording sheet feed tray, which is capable of stacking a plurality of recording sheets 2 for retention. The surface of the feed roller 10 is formed by rubber material. The feed roller 10 has an arc portion, which comes into contact with a sheet, and a chord portion, which is out of contact with the sheet.

When the driving motor 20 rotates in a state where the pendulum arm 34 is unlocked with the carriage 4 having moved to the waiting position 100, the driving power is transmitted to the recording sheet feed gear 10a through the recording drive gear train 33. The feed roller 10 and a pressure plate release cam 35, which is coaxial with and fixed to the feed roller 10, rotate clockwise direction (in the direction indicated by the arrow A), and when the pressure plate release cam 35, which is in contact with an extrusion 9a to push down the pressure plate 9, leaves from the extrusion 9a by the rotation thereof, the pressure plate 9 is pulled up by force of a spring (not shown). As a result, it is made possible for the recording sheet 2 to be in contact with the feed roller 10 under pressure. In such condition, the arc portion of the feed roller 10 rotates in the direction indicated by the arrow A, thus transporting the recording sheet 2. A separation claw (not shown) separates the recording sheet 2 thus transported by the feed roller 10 so that only the uppermost recording sheet of those set as a stack is fed and transported.

(Original Feeding Means)

In FIG. 1, a reference numeral 11 designates a feed tray that retains a plurality of originals 12. With the rotation of the feed roller 10 in the direction indicated by the arrow B, the originals 12 set in the original tray 11 is fed one after another.

A reference numeral 13 designates a separation pad formed by material having a high friction coefficient, such as rubber, which is biased to the feed roller 10 by a separation spring 14.

The leading edges of originals 12 enter the wedge portion formed by the separation pad 13 and the feed roller 10. Then, of the originals retained by such wedge portion, only the lowest one is fed and transported by the friction of the feed roller 10.

In the present embodiment, the separating mechanism is provided, but in a case of the equipment of single-sheet feeding type, recording sheet feeding means is not necessarily provided with a separation claw. Also, original feeding means does not need such separating mechanism as the separation pad 13 or the like.

(Drive Switching)

Figure 6:
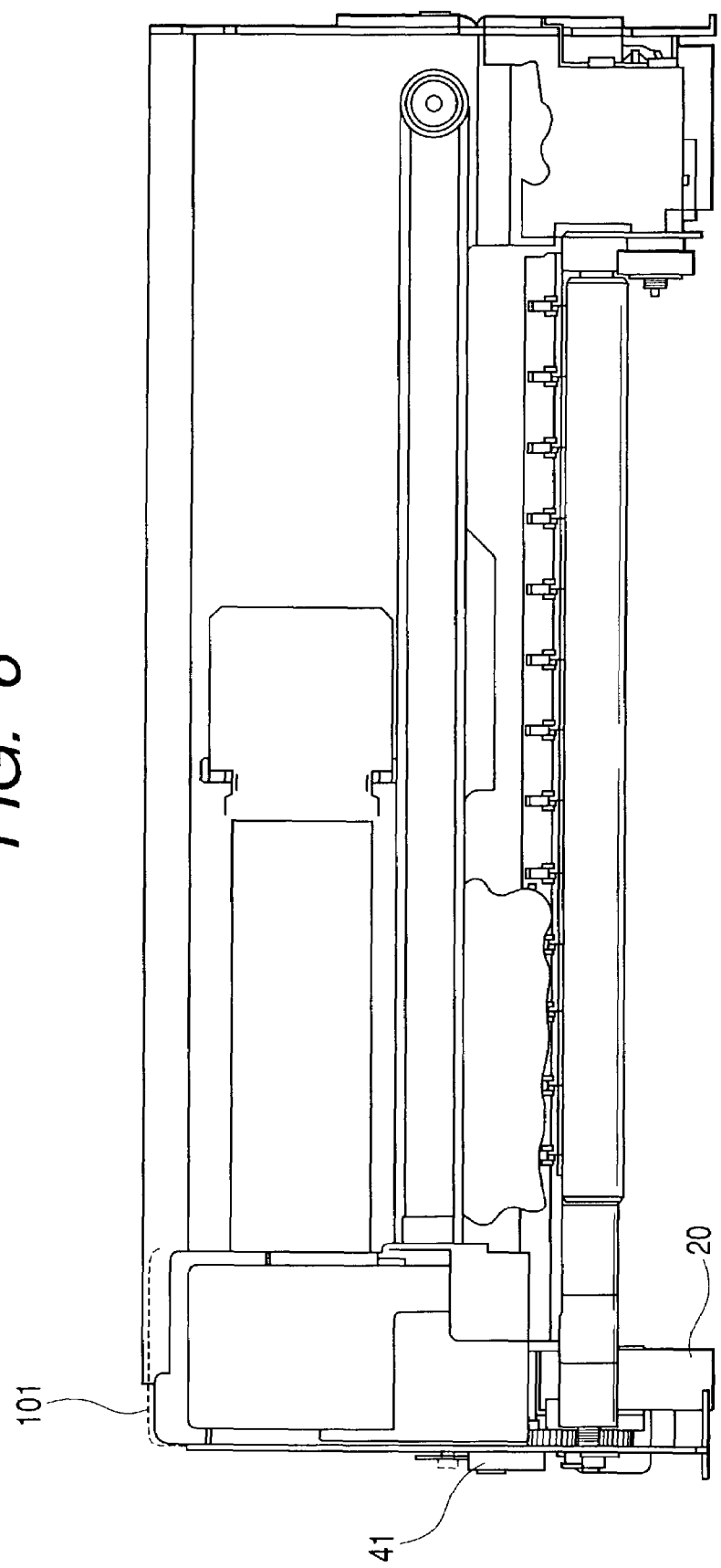
FIG. 6 is a plan view that shows the recording portion of the image reading and recording apparatus according to the embodiment of the present invention.
Figure 7:
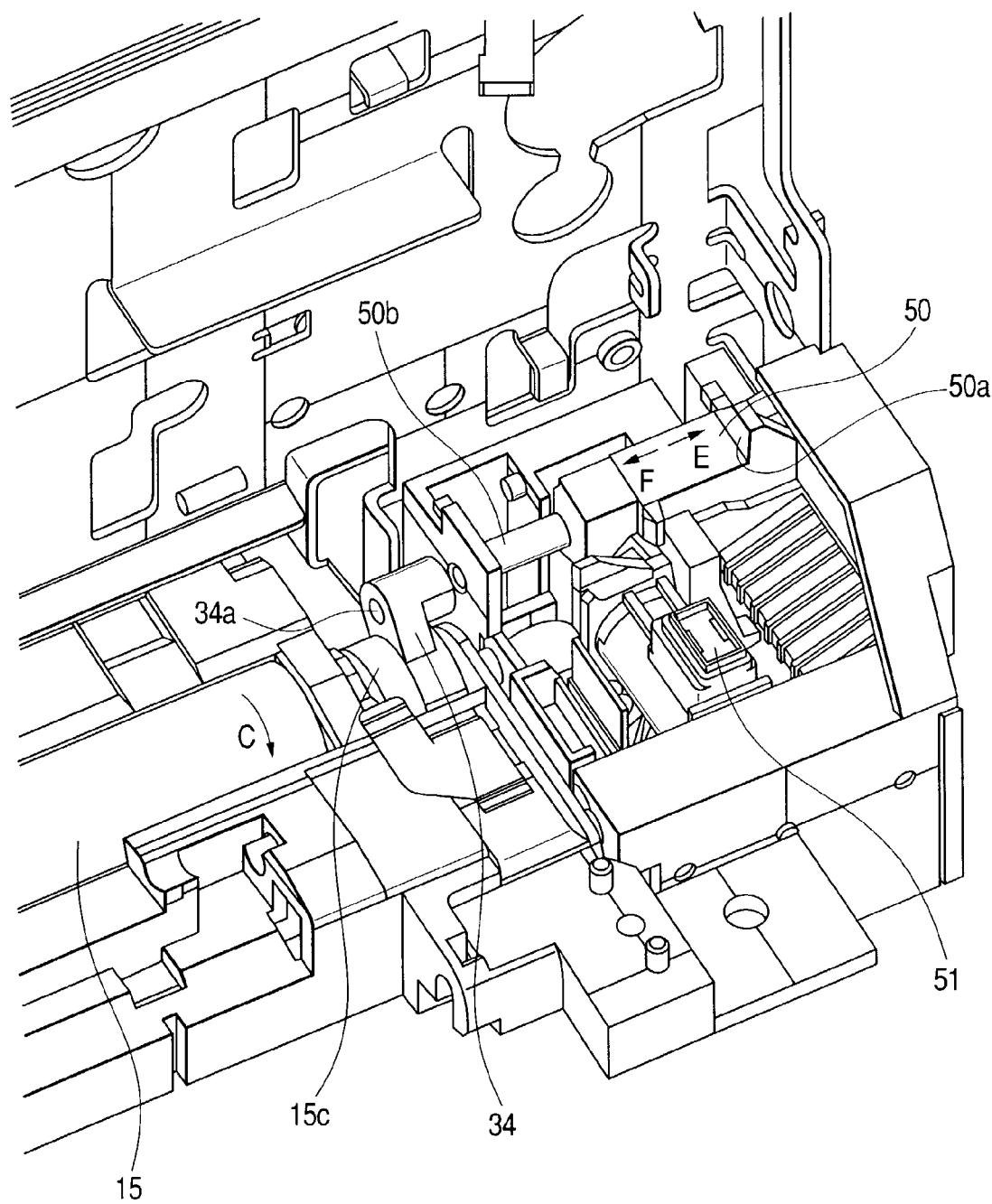
FIG. 7 is a perspective view that shows a carriage waiting position in the image reading and recording apparatus according to the embodiment of the present invention.
Figure 8:
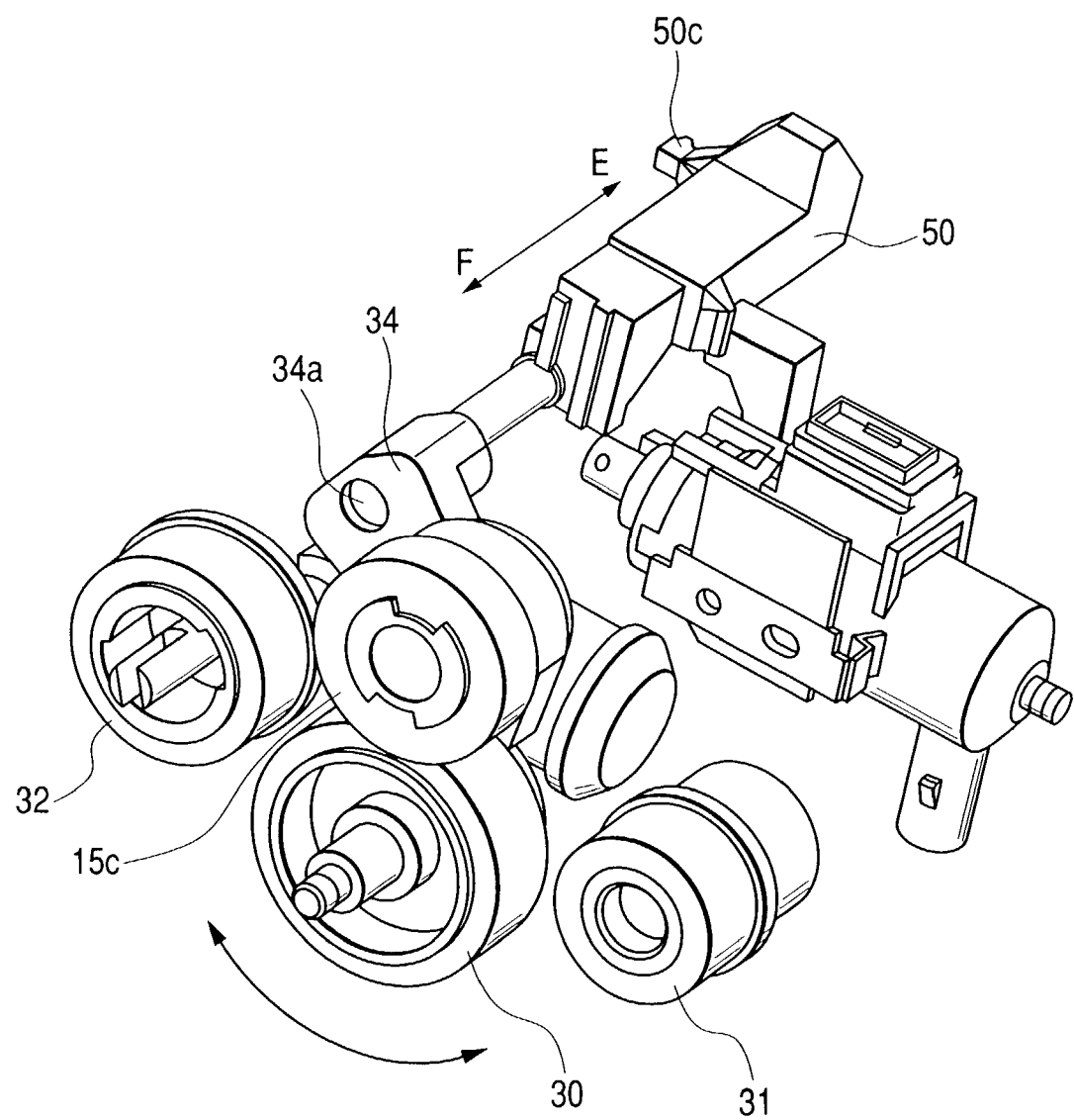

As shown in FIG. 4, a drive switching gear 41 is axially supported by the carriage 4, which engages with the gear 42a of the reading drive gear train 42 and a first roller gear 15b disposed on a left side surface of the apparatus when the carriage reaches the drive switching position 101 located outside the recording area on the left end of the apparatus as shown in FIG. 6.

The reading drive gear train 42 includes gears 42a, 42b, 42c, 42d, 42e, 42f, 42g, and 42h. The gear 42f is coaxial with and fixed to the original transport roller 43a. Also, the gear 42h engages with the original feed gear 10b coaxial with and fixed to the feed roller 10.

In this way, the driving power of the driving motor 20, which has not been transmitted at the time of recording sheet feeding, is transmitted to the feed roller 10 through the output gear 20a, idler gear 20b, drive switching gear 41, reading drive gear train 42, and original feed gear 10b. Then, with the counterclockwise rotation of the driving motor 20 in FIG. 1, the feed roller 10 rotates in the direction indicated by the arrow B, thus separating and feeding the originals 12 one by one.

The carriage 4 stays in the drive switching position 101 until the feed and transportation of an original is completed, and the original 12 is transported by the driving power, which is also transmitted to the original feed roller 43. When the DES 21 detects the trailing edge of the original 12, the carriage 4 returns to the waiting position 100.

In the drive switching position 101, the ink cartridge 1 discharges ink droplets periodically in order to avoid the clogging of discharge ports due to the dry of the ink head. Therefore, in a designated position of the platen 3, an opening (not shown) is formed, to which ink is discharged. On the lower part of the opening, ink absorbent is arranged to absorb and retain waste ink thus discharged.

In the present embodiment, ink droplets are discharged as a measure to prevent ink clogging. However, it may be possible to arrange instead a protection member, which is used in the waiting position 100.

(Transportation Guiding Means)

The original or the recording sheet, which has been fed by the feed roller 10, is guided by a guide member 3a. As shown in FIG. 2, there are arranged the transport roller 15 and pinch roller 16, which serve as guide means on the upstream side of the recording sheet 2 and the original 12. The transport roller 15 and the pinch roller 16 are in pressure contact with each other, and transport the recording sheet 2 and the original 12, which have been sent out by the transport roller 15, to the platen 3 on the downstream side.

There are also arranged a delivery roller 17 and spurs 18, which serve as guide means for the recording sheet 2 and the original 12 on the downstream side. As shown in FIG. 4, the spurs 18 are arranged in plural locations in the axial direction, and formed by the material that does not allow the transfer of ink even if it is in contact with the recording surface of a recording sheet 2 after recording.

With the cooperative operation of the delivery roller 17 and the spurs 18, an original 12 after reading and a recording sheet 2 after image recording are transported, and the recording sheet 2 is delivered to a delivery tray 19 provided outside the apparatus as shown in FIG. 2.

(Image Reading Means)

When the starting command of reading operation is provided through the operation panel or the like (not shown), the carriage 4 moves to the drive switching position 101 to transmit driving power to the reading drive gear train 42 if the DS 44, which detects the presence and absence of an original, detects the presence of the original.

If the DS 44 detects the absence of original, the operation is suspended once, while an error message is shown on the panel so as to prompt the user to set an original.

An original 12 is separated and fed by the feed roller 10 in accordance with the operation described earlier. The DES 21 detects the leading edge of the original 12. The original 12 is allowed to enter the common transportation route, which is shared for use by a recording sheet nipped by a contact sensor 22, which serves as image reading means or reading sensor, and a readable white background. The contact sensor 22 reads the images on the original 12.

After the completion of a sheet-delivery operation to be described later, if the DS 44 detects the presence of an original, the carriage 4 stays in the drive switching position 101 to continue reading operation. Also, on the contrary, if the DS 44 detects the absence of an original, the carriage 4 returns to the waiting position.

(Recording Operation)

Next, the description will be made of the recording operation of the facsimile machine structured as described above. When the starting command for recording operation is provided through the operation panel or the like (not shown), the feed roller 10 begins to rotate in the direction indicated by the arrow A in FIG. 2, and the uppermost recording sheet 2 of those stacked on the recording sheet tray 8 is separated and fed one by one. Then, if any one of recording sheets 2 does not arrive at the DES 21 even after a transporting operation for a designated amount, the transportation of the recording sheet is interpreted as an error, and this operation stops. Then, an error message is indicated on the operation panel or the like (not shown).

The recording sheet 2, which has been fed out by the feed roller 10, is nipped and transported by the transport roller 15 and the pinch roller 16 so as to arrive at the recording position of the platen 3.

The recording operation is performed by the carriage 4 that discharges ink from the ink cartridge 1 in accordance with image information while reciprocating.

After completion of recording, the recording sheet 2 is nipped and transported by the delivery roller 17 and the spurs 18 to the delivery tray 19 outside the apparatus and stacked thereon one after another.

As described above, there are provided original feeding means and recording sheet feeding means for feeding an original and a recording sheet, respectively, and original drive transmitting means and recording sheet drive transmitting means for driving the original feeding means and the recording sheet feeding means, respectively. The drive of the original feeding means and the drive of the recording sheet feeding means are performed by a single driving source. The structure is arranged so that the driving power is switched by the changeover of transmission depending on the engagement and disengagement of drive switching gears provided in moving means for moving recording means. Therefore, it becomes possible to provide an image reading and recording apparatus capable of using one driving source for the materialization of downsizing of the apparatus at lower costs. Also, there is no need for an original and a recording sheet to pass different transport route, making it possible for them to share one transport route. In this way, the provision of an image reading and recording apparatus is made attainable in a size smaller still at more reduced costs.

What is claimed is:

1. An image reading and recording apparatus comprising:
   original feeding means for feeding an original;
   recording sheet feeding means for feeding a recording sheet;
   a driving source for generating driving power for said original feeding means and said recording sheet feeding means;
   original drive transmitting means for transmitting driving power from said driving source to said original feeding means;
   recording sheet drive transmitting means for transmitting driving power from said driving source to said recording sheet feeding means;
   moving means movable in a direction perpendicular to a transport direction of the recording sheet; and
   recording means arranged on said moving means for performing a recording operation to a recording sheet,
   wherein said moving means switches driving power from said driving source in a drive switching position to transmit the driving power to said original drive transmitting means.

2. An image reading and recording apparatus according to claim 1, wherein said drive switching position is a position of said moving means having being moved to an area, in which no recording is performed by said recording means, outside a recording area.

3. An image reading and recording apparatus according to claim 1 or claim 2, further comprising recording sheet separating means.

4. An image reading and recording apparatus according to claim 1 or claim 2, further comprising original separating means.

5. An image reading and recording apparatus according to claim 1 or claim 2, further comprising:
   recording sheet separating means; and
   original separating means.

6. An image reading and recording apparatus according to claim 1 or claim 2, wherein said moving means includes a gear, and driving power is transmitted from said driving source to said original drive transmitting means with an engagement of the gear in said drive switching position.

7. An image reading and recording apparatus according to claim 1 or claim 2, wherein an original and a recording sheet pass one transport route.

8. An image reading and recording apparatus according to claim 1 or claim 2, wherein an original and a recording sheet pass one transport route, and image reading means is provided in the one transport route.

9. An image reading and recording apparatus according to claim 1 or claim 2, wherein said recording means is of an ink jet recording type for recording on a recording sheet by discharging ink in accordance with a signal.

10. An image reading and recording apparatus according to claim 9, wherein said moving means includes a protection mechanism to cover an ink discharge mechanism provided in said recording means in the drive switching position.

11. An image reading and recording apparatus according to claim 9, wherein said moving means includes an ink retaining mechanism for discharging ink from said recording means in the drive switching position.

12. An image reading and recording apparatus comprising:
- a feed tray for stacking a recording sheet;
- an original tray for stacking an original;
- a feed roller for feeding the recording sheet on said feed tray by rotating in a first direction and for feeding the original in said original tray by rotating in a second direction opposite to said first direction;
- a guide for guiding the recording sheet or the original fed by said feed roller;
- a transport roller for transporting the recording sheet or the original fed by said feed roller;
- a reading sensor for reading an image of the original guided by said guide;
- a recording head supported by a carriage, which is reciprocated in a cross direction of the recording sheet to be transported, for recording the image on the recording sheet guided by said guide, while being reciprocated by the carriage;
- a first gear train for transmitting driving power for rotating said feed roller in the first direction;
- a motor for driving said transport roller; and
- a first drive transmitting gear movable between a position in which the driving power of said motor is transmitted to said first gear train and a position in which the driving power of said motor is not transmitted to said first gear train,
- wherein when the carriage is moved to a first position, said first drive transmitting gear is moved to the position in which the driving power of said motor is transmitted to said first gear train.

13. An image reading and recording apparatus according to claim 12, wherein when said carriage is out of said first position, said first drive transmitting gear is fixed to the position in which the driving power of said motor is not transmitted to said first gear train.

14. An image reading and recording apparatus according to claim 12 or claim 13, wherein when said carriage is in said first position, said first drive transmitting gear is moved by the driving power of said motor to the position in which the driving power of said motor is transmitted to said first gear train.

15. An image reading and recording apparatus comprising:
- a feed tray for stacking a recording sheet;
- an original tray for stacking an original;
- a feed roller for feeding the recording sheet on said feed tray by rotating in a first direction and for feeding the original on said original tray by rotating in a second direction opposite to said first direction;
- a guide for guiding the recording sheet or the original fed by said feed roller;
- a transport roller for transporting the recording sheet or the original fed by said feed roller;
- a reading sensor for reading an image of the original guided by said guide;
- a recording head supported by a carriage, which is reciprocated in a cross direction of the recording sheet to be transported, for recording the image on the recording sheet guided by said guide, while being reciprocated by the carriage;
- a second gear train for transmitting driving power for rotating said feed roller in the second direction;
- a motor for driving said transport roller; and
- a second drive transmitting gear movable between a position in which the driving power of said motor is transmitted to said second gear train and a position in which the driving power of said motor is not transmitted to said second gear train,
- wherein when the carriage is moved to a second position, said second drive transmitting gear is moved to the position in which the driving power of said motor is transmitted to said second gear train.

16. An image reading and recording apparatus according to claim 15, wherein said second drive transmitting gear is movable together with the carriage.

17. An image reading and recording apparatus comprising:
- a feed tray for stacking a recording sheet;
- an original tray for stacking an original;
- a feed roller for feeding the recording sheet on said feed tray by rotating in a first direction and for feeding the original on said original tray by rotating in a second direction opposite to said first direction;
- a guide for guiding the recording sheet or the original fed by said feed roller;
- a transport roller for transporting the recording sheet or the original fed by said feed roller;
- a reading sensor for reading an image of the original guided by said guide;
- a recording head supported by a carriage, which is reciprocated in a cross direction of the recording sheet to be transported, for recording the image on the recording sheet guided by said guide, while being reciprocated by the carriage;
- a first gear train for transmitting driving power for rotating said feed roller in the first direction;
- a second gear train for transmitting driving power for rotating said feed roller in the second direction;
- a motor for driving said transport roller;
- a first drive transmitting gear movable between a position in which the driving power of said motor is transmitted to said first gear train and a position in which the driving power of said motor is not transmitted to said first gear train; and
- a second drive transmitting gear movable between a position in which the driving power of said motor is transmitted to said second gear train and a position in which the driving power of said motor is not transmitted to said second gear train,
- wherein when the carriage is moved to a first position, said first drive transmitting gear is moved to the position in which the driving power of said motor is transmitted to said first gear train, and when the carriage is moved to a second position, said second drive transmitting gear is moved to the position in which the driving power of said motor is transmitted to said second gear train.

18. An image reading and recording apparatus according to claim 17, wherein when the carriage is out of the first position, said first drive transmitting gear is fixed to the position in which the driving power of said motor is not transmitted to said first gear train.

19. An image reading and recording apparatus according to claim 18, wherein when the carriage is in the first position, said first drive transmitting gear is moved by the driving power of said motor to the position in which the driving power of said motor is transmitted to said first gear train.

20. An image reading and recording apparatus according to claim 17, wherein said second drive transmitting gear is moved together with the carriage to the position in which the driving power of said motor is transmitted to said second gear train.

21. An image reading and recording apparatus according to any one of claims 17–20, wherein even when said motor rotates said feed roller in the first direction and also even when said motor rotates said feed roller in the second direction, said motor rotates in one direction.

22. An image reading and recording apparatus according to claim 21, wherein even when said motor rotates said feed roller in the first direction and also even when said motor rotates said feed roller in the second direction, said motor rotates in one direction in which said transport roller is rotated in a transport direction of the original or the recording sheet.

* * * * *